(12) United States Patent
Fletcher et al.

(10) Patent No.: US 12,726,123 B2
(45) Date of Patent: Sep. 1, 2026

(54) REGULATOR SWITCH ARRAY

(71) Applicant: Apple Inc., Cupertino, CA (US)

(72) Inventors: Jay B. Fletcher, Sunnyvale, CA (US); Nathan F. Hanagami, San Francisco, CA (US); Sanjay Pant, Santa Clara, CA (US); Hao Zhou, San Jose, CA (US); Shawn Searles, Austin, TX (US)

(73) Assignee: Apple Inc., Cupertino, CA (US)

( * ) Notice: Subject to any disclaimer, the term of this patent is extended or adjusted under 35 U.S.C. 154(b) by 110 days.

(21) Appl. No.: 18/792,905

(22) Filed: Aug. 2, 2024

(65) Prior Publication Data

US 2024/0396452 A1 Nov. 28, 2024

Related U.S. Application Data

(63) Continuation of application No. 17/661,509, filed on Apr. 29, 2022, now Pat. No. 12,081,124.

(51) Int. Cl.
*H02M 3/158* (2006.01)
*G06F 1/26* (2006.01)

(52) U.S. Cl.
CPC ............ *H02M 3/158* (2013.01); *G06F 1/263* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135;
(Continued)

(56) References Cited

U.S. PATENT DOCUMENTS 6,351,108 B1 * 2/2002 Burstein .............. H02M 3/157 323/283
7,573,249 B2 8/2009 Sutardja et al.
(Continued)

OTHER PUBLICATIONS

International Search Report and Written Opinion in PCT Appl. No. PCT/US2023/066109 mailed Aug. 10, 2023, 9 pages.

*Primary Examiner* — Jeffrey A Gblende
(74) *Attorney, Agent, or Firm* — Kowert, Hood, Munyon, Rankin & Goetzel, P.C.; Gentry C. McLean; Dean M. Munyon

(57) ABSTRACT

A voltage regulator circuit included in a computer system may employ a control circuit and a switch array that includes multiple switch circuits. Different groups of switch circuits that include respective groups of switch devices are coupled between an input power supply node and corresponding regulated power supply nodes. To maintain desired respective voltages on the regulated power supply nodes, the control circuit compares the voltages of the regulated power supply nodes to corresponding reference voltages and, based on results of the comparisons, opens and closes various ones of the switch devices included in the different groups of switch circuits.

20 Claims, 14 Drawing Sheets

(58) Field of Classification Search
CPC ........ H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

U.S. PATENT DOCUMENTS 7,622,904 B2 11/2009 Sutardja et al.
7,948,720 B2 5/2011 Mok
8,830,104 B2 9/2014 Henzler
8,957,657 B2 * 2/2015 Zhao .................... H03K 17/166 323/284
10,211,728 B2 2/2019 Hu
10,359,834 B2 7/2019 Maiyuran et al.
10,535,394 B2 1/2020 Kim et al.
10,684,671 B2 6/2020 Sridhar et al.
11,070,124 B2 7/2021 Ishida
11,742,762 B2 8/2023 Puggelli
2013/0127492 A1 5/2013 Kammerer et al.
2018/0316255 A1 11/2018 Tang
2019/0271998 A1 9/2019 Sisson et al.
2021/0075316 A1 3/2021 Oshita et al.
2021/0247827 A1 8/2021 Couleur et al.
2022/0029536 A1 1/2022 Zyuban et al.

* cited by examiner

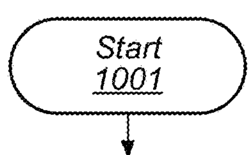

Performing a first comparison of a voltage of a first regulated power supply node to a first reference voltage
1002

Activating, based on a first result of the first comparison, a particular switch circuit of a first subset of a plurality of switch circuits, wherein the first subset is coupled between an input power supply node and the first regulated power supply node, and wherein a number of switch circuits included in the first subset is based on a first target load current for the first regulated power supply node
1003

Performing a second comparison of a voltage of a second regulated power supply node to a second reference voltage
1004

Adjusting, based on a second result of the second comparison, a conductance between the input power supply node and the second regulated power supply node by activating a different switch circuit of a second subset of a plurality of switch circuits, wherein the second subset is coupled between the input power supply node and the second regulated power supply node, and wherein a number of switch circuits included in the second subset of the plurality of switch circuits is based on a second target load current for the second regulated power supply node
1005

End
1006

FIG. 10

REGULATOR SWITCH ARRAY

PRIORITY CLAIM

The present application is a continuation of U.S. patent application Ser. No. 17/661,509 entitled "Regulator Switch Array," filed Apr. 29, 2022, the disclosure of which is incorporated by reference herein in its entirety.

BACKGROUND

Technical Field

This disclosure relates to power management in computer systems and, more particularly, to voltage regulator circuit operation.

Description of the Related Art

Modern computer systems may include multiple circuit blocks designed to perform various functions. For example, such circuit blocks may include processors and/or processor cores configured to execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generate regulated voltage levels on respective power supply signals using a voltage level of an input power supply signal. Such regulator circuits may employ multiple passive circuit elements, such as inductors, capacitors, and the like.

SUMMARY OF THE EMBODIMENTS

Various embodiments for generating a regulator power supply voltage level are disclosed. Broadly speaking, a voltage regulator circuit includes a plurality of switch circuits and a control circuit. The plurality of switch circuits includes a first subset of switch circuits coupled between an input power supply node and a particular regulated power supply node. A number of switch circuits included in the first subset is based on a first target load current for the particular regulated power supply node. The plurality of switch circuits also includes a second subset of switch circuits coupled between the input power supply node and a different regulated power supply node. A number of switch circuits included in the second subset is based on a second target load current for the different regulated power supply node. The control circuit is configured to close, using one or more control signals, at least one switch device of a first plurality of switch devices included in the first subset based on a comparison of a first reference voltage to a voltage level of the particular regulated power supply node. The control circuit is also configured to close, using the one or more control signals, at least one switch device of a second plurality of switch devices included in the second subset based on a comparison of a second reference voltage to a voltage level of the different regulated power supply node.

BRIEF DESCRIPTION OF THE DRAWINGS

FIG. 10 is a flow diagram of an embodiment of a method for operating a voltage regulator circuit.

DETAILED DESCRIPTION OF EMBODIMENTS

Figure 1:
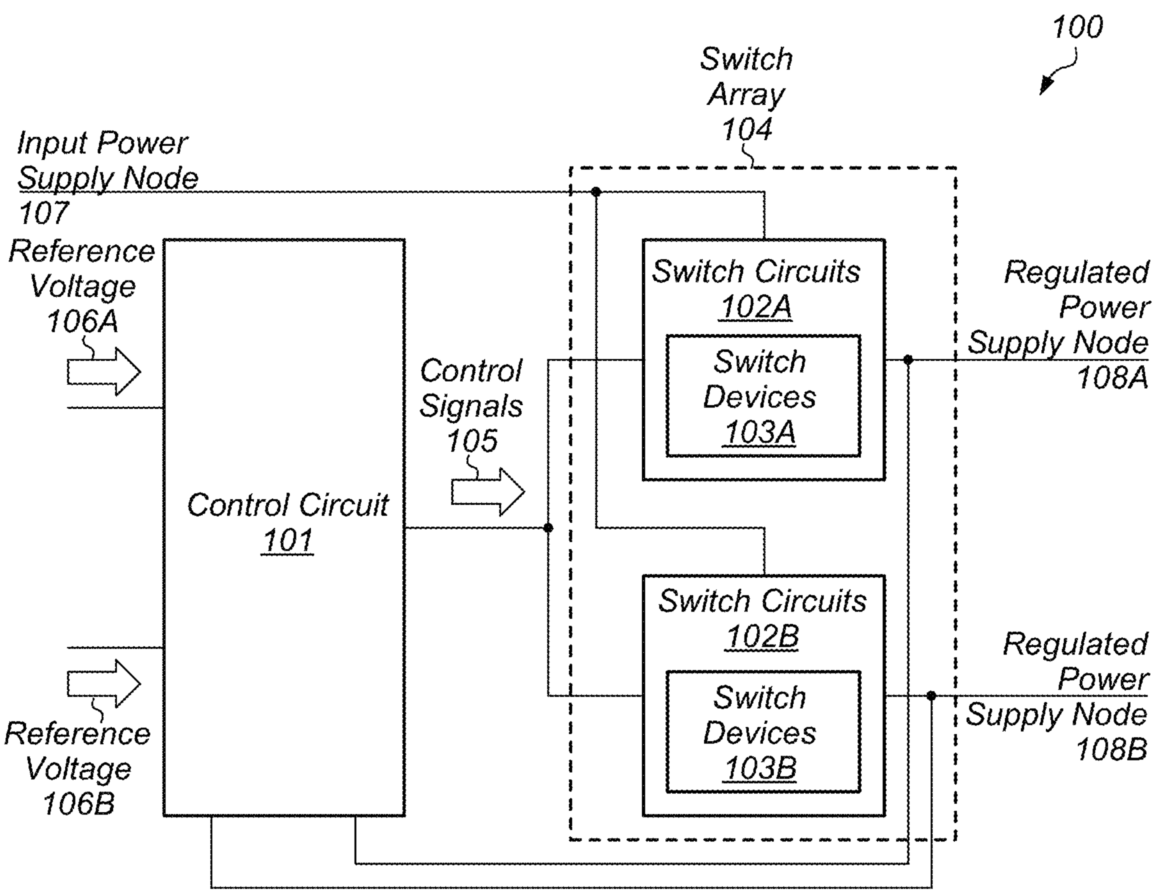
FIG. 1 is a block diagram of an embodiment of a voltage regulator circuit for a computer system.

Computer systems may include multiple circuit blocks configured to perform specific functions. Such circuit blocks may be fabricated on a common substrate and may employ different power supply voltage levels. Power management units (commonly referred to as "PMUs") may include multiple voltage regulator circuits configured to generate regulated voltage levels for various power supply signals. Such voltage regulator circuits may employ both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. For example, PMUs may employ one or more power converter circuits that source energy to a regulated power supply node via an inductor. Other PMUs employ one or more low-dropout ("LDO") regulator circuits where the additional passive devices associated with a power converter circuit are cost and area prohibitive.

During design of an integrated circuit, load current estimates are determined for different regulated power supply nodes within the integrated circuit, and voltage regulator circuits are designed based on the estimates. The design of such voltage regulator circuits can be complex, requiring dedicated high-voltage transistors, customized mask design, and the like. In some cases, the initial load current estimates change during the design process, which can result in lengthy re-design of voltage regulator circuits adding to the cost and schedule of the integrated circuit.

The embodiments illustrated in the drawings and described below may provide techniques for generating multiple regulated power supply signals from different input power supply signals by using a configurable switch array that includes multiple switch circuits that include multiple switch devices. Different groups of switch circuits that include multiple switch devices are coupled between different input power supply nodes and different regulated power supply nodes. By activating and de-activating various switch devices within the different groups of switch circuits, the conductance between a given input power supply node and a given regulated power supply node may be adjusted to maintain a desired voltage level of the given regulated power supply node. By employing such a configurable switch array, the design of a voltage regulator circuit can be easily adapted to accommodate last-minute changes to load current estimates by changing the number of switch circuits coupled to a given regulated power supply node. For example, if, during the final stages of a design of an integrated circuit, the load current for a particular regulated power supply node is determined to be over budget, additional switch circuits of the voltage regulator circuit can be coupled to the particular regulated power supply node to supply the additional load current without having to re-design the voltage regulator circuit. Alternatively, if the load current for the particular regulated power supply node is determined to be under budget, one or more switch circuits of the voltage regulator circuit can be de-coupled from the particular regulated power supply node to improve the power efficiency of the voltage regulator circuit without having to re-design the voltage regulator circuit. Moreover, by employing high-speed transistors as the switch devices, the use of costly high-voltage transistors can be reduced, thereby reducing the cost of an integrated circuit as well as making the migration of the voltage regulator circuit from one semiconductor process to another less difficult.

A block diagram depicting an embodiment of a voltage regulator circuit is illustrated in FIG. 1. As illustrated, voltage regulator circuit 100 includes control circuit 101, and switch array 104.

Switch array 104 includes a plurality of switch circuits including switch circuits 102A and 102B. Switch circuits 102A includes a first subset of the plurality of switch circuits coupled between input power supply node 107 and regulated power supply node 108A. In various embodiments, a number of switch circuits included in switch circuit 102A may be based on a target load current for regulated power supply node 108A.

Switch circuits 102B includes a second subset of the plurality of switch circuits coupled between input power supply node 107 and regulated power supply node 108B. In various embodiments, a number of switch circuits included in switch circuit 102B may be based on a target load current for regulated power supply node 108B.

As described below, a given switch circuit includes multiple switch devices coupled between the power supply nodes to which the given switch circuit is coupled. For example, a given one of switch circuits 102A includes switch devices 103A, and switch circuits 102B includes switch devices 103B. In various embodiments, the switch devices may be implemented using various field-effect transistors, including high-speed thin-oxide field-effect transistors commonly used to implement high-speed logic circuits.

Control circuit 101 is configured to close, using control signals 105, at least one switch device of switch devices 103A based on a comparison of reference voltage 106A to a voltage level of regulated power supply node 108A. Control circuit 101 is further configured to close, using control signals 105, at least one switch device of switch devices 103B based on a comparison of reference voltage 106B to a voltage level of regulated power supply node 108B. By adjusting a number of switch devices that are active within the various switch circuits included in switch array 104, a desired voltage level may be maintained on a regulated power supply node.

Figure 2:
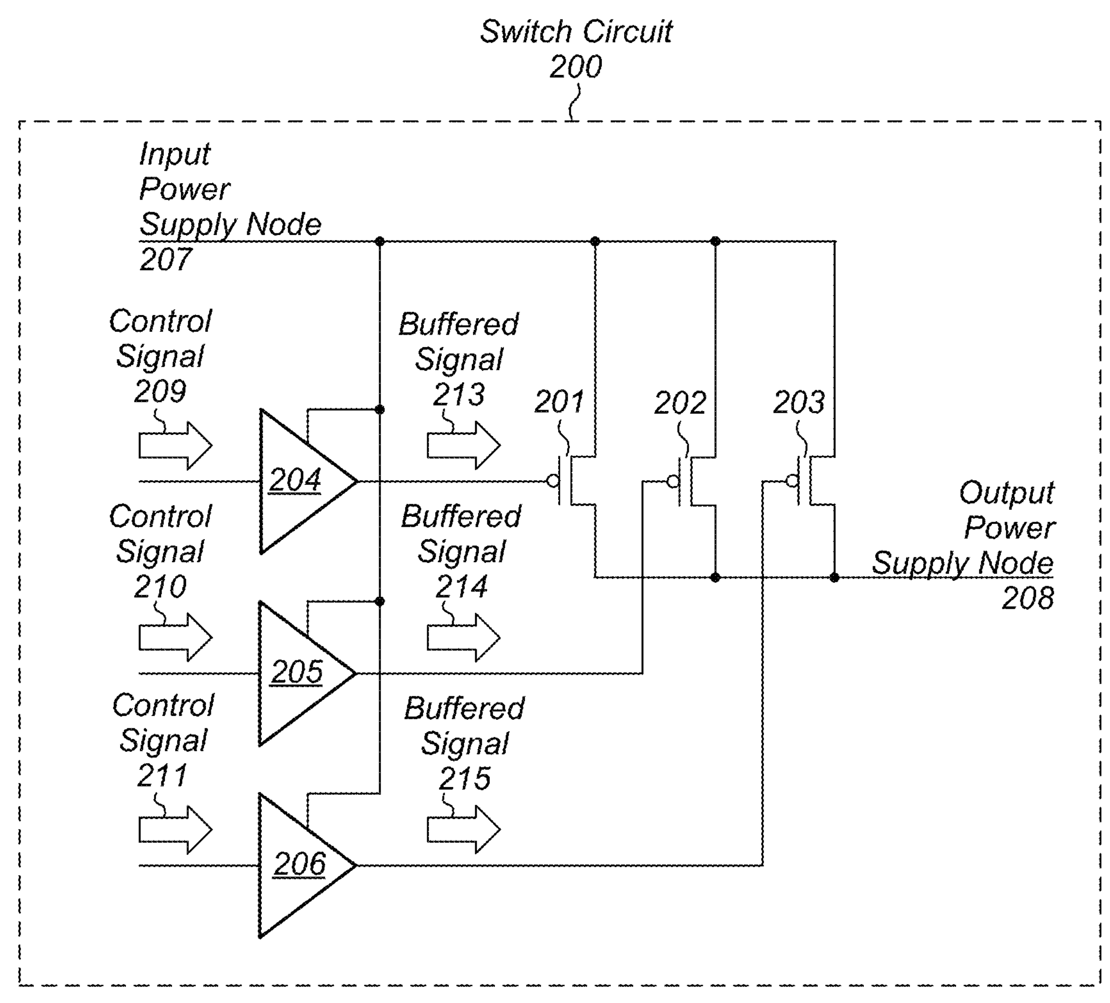
FIG. 2 is a block diagram of an embodiment of a switch circuit.

Turning to FIG. 2, an embodiment of a switch circuit is depicted. In various embodiments, switch circuit 200 may correspond to either of switch circuits 102A or 102B as depicted in FIG. 1. As illustrated, switch circuit 200 includes switch devices 201-203 and buffer circuits 204-206.

Switch devices 201-203 are coupled, in parallel, between input power supply node 207 and output power supply node 208, and are controlled by corresponding ones of buffered signals 213-215. In various embodiments, input power supply node 207 may correspond to input power supply node 107 of FIG. 1, and output power supply node 208 may correspond to either of regulated power supply nodes 108A or 108B. It is noted that although three switch devices are depicted in the embodiment of FIG. 2, in other embodiments, any suitable number of switch devices may be employed.

Each of switch devices 201-203 is configured, in response to activation of a corresponding one of buffered signals 213-215, to couple output power supply node 208 to input power supply node 207. For example, an activation of buffered signal 213 will cause switch device 201 to activate, allowing current to flow from input power supply node 207 to output power supply node 208 through switch device 201. As more of switch devices 201-203 are activated, the conductance between input power supply node 207 and output power supply node 208 decreases, allowing more current to be sourced to output power supply node 208, thereby increasing the voltage level of output power supply node 208.

In various embodiments, switch devices 201-203 may be implemented as p-channel metal-oxide semiconductor field-effect transistors (MOSFETs), fin field-effect transistors (FINFETs), gate-all-around field-effect transistors (GAAFETs), or any other suitable transconductance devices. It is noted that the electrical characteristics of switch devices 201-203 may be different from one another. In some cases, the respective widths of switch devices 201-203 may be different to allow each of switch devices 201-203 to have a different conductance between input power supply node 207 and output power supply node 208 when activated. For example, in some cases, the respective widths of switch devices 201-203 may be binary weighted such that the width of switch device 202 is twice the width of switch device 201, and so on.

Buffer circuits 204-206 are coupled to input power supply node 207 and are configured to generate buffered signals 213-215 using corresponding ones of control signals 209-211. In various embodiments, control signals 209-211 may be included in control signals 105 generated by control circuit 101 as depicted in FIG. 1. Although three buffer circuits are depicted in the embodiment of FIG. 2, in other embodiments where different numbers of switch devices are employed, a corresponding number of buffer circuits may be used. In various embodiments, buffer circuits 204-206 may be implemented using any suitable combination of inverter circuits, non-inverting amplifier circuits, and the like.

It is noted that a voltage level corresponding to an active state of buffered signals 213-215 may be based on a type of transconductance device used to implement switch devices 201-203. For example, in the case where switch devices 201-203 are implemented using p-channel MOSFETs, the voltage level corresponding to an active state of buffered signals 213-215 may be at or near ground potential.

Figure 3:
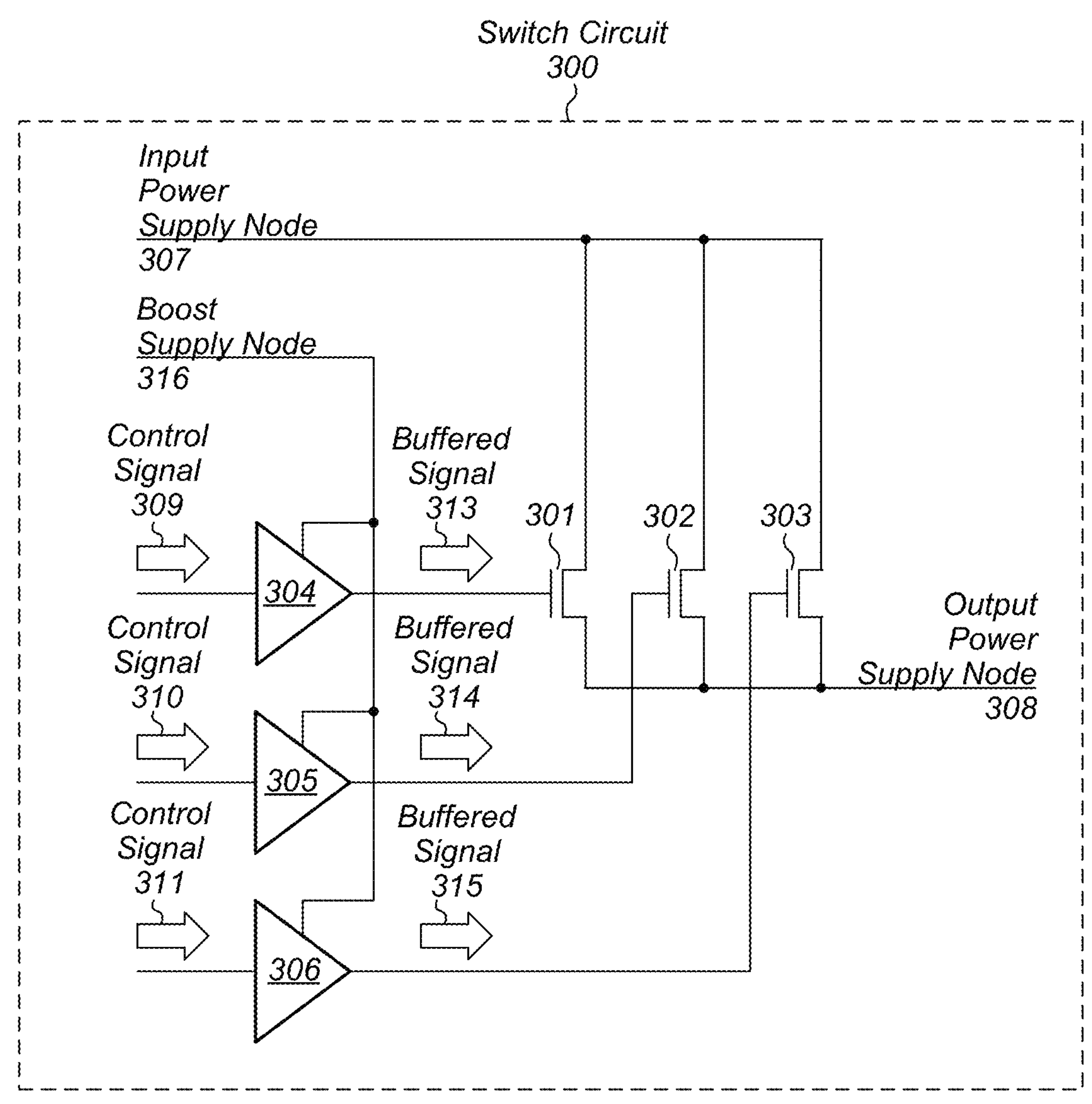
FIG. 3 is a block diagram of another embodiment of a switch circuit.

Turning to FIG. 3, another embodiment of a switch circuit is depicted. In various embodiments, switch circuit 300 may correspond to either of switch circuits 102A or 102B as depicted in FIG. 1. As illustrated, switch circuit 300 includes switch devices 301-303 and buffer circuits 304-306.

Switch devices 301-303 are coupled, in parallel, between input power supply node 307 and output power supply node 308, and are controlled by corresponding ones of buffered signals 313-315. In various embodiments, input power supply node 307 may correspond to input power supply node 107 of FIG. 1, and output power supply node 308 may correspond to either of regulated power supply nodes 108A or 108B. It is noted that although three switch devices are depicted in the embodiment of FIG. 3, in other embodiments, any suitable number of switch devices may be employed.

Each of switch devices 301-303 is configured, in response to activation of a corresponding one of buffered signals 313-315, to couple output power supply node 308 to input power supply node 307. For example, an activation of buffered signal 313 will cause switch device 301 to activate, allowing current to flow from input power supply node 307 to output power supply node 308 through switch device 301. As more of switch devices 301-303 are activated, the conductance between input power supply node 307 and output power supply node 308 decreases, allowing more current to be sourced to output power supply node 308, thereby increasing the voltage level of output power supply node 308.

In various embodiments, switch devices 301-303 may be implemented as n-channel MOSFETs, FINFETs, GAAFETs, or any other suitable transconductance devices. It is noted that the electrical characteristics of switch devices 301-303 may be different from one another. In some cases, the respective widths of switch devices 301-303 may be different to allow each of switch devices 301-303 to have a different conductance between input power supply node 307 and output power supply node 308 when activated. For example, in some cases, the respective widths of switch devices 301-303 may be binary weighted such that the width of switch device 302 is twice the width of switch device 301, and so on.

Buffer circuits 304-306 are coupled to boost supply node 316 and are configured to generate buffered signals 313-315 using corresponding ones of control signals 309-311. In various embodiments, control signals 309-311 may be included in control signals 105 generated by control circuit 101 as depicted in FIG. 1. Although three buffer circuits are depicted in the embodiment of FIG. 3, in other embodiments where different numbers of switch devices are employed, a corresponding number of buffer circuits may be used. In various embodiments, buffer circuits 304-306 may be implemented using any suitable combination of inverter circuits, non-inverting amplifier circuits, and the like.

In some cases, the use of n-channel MOSFETs, FinFET, GAAFETs, and the like may be preferable to p-channel versions of the devices for cost and performance reasons. In such cases, the gate-to-source voltage used to activate switch devices 301-303 must be higher than the drain voltage of switch devices 301-303 to achieve the highest conductance. To provide sufficient gate-to-source voltage for switch devices 301-303, an active state of buffered signals 313-315 corresponds to a voltage level of boost supply node 316, which is greater than a voltage level of input power supply node 307. In various embodiments, the voltage level of boost supply node 316 is greater than the voltage level of input power supply node 307 by at least an amount corresponding to a threshold voltage associated with switch devices 301-303.

Figure 4:
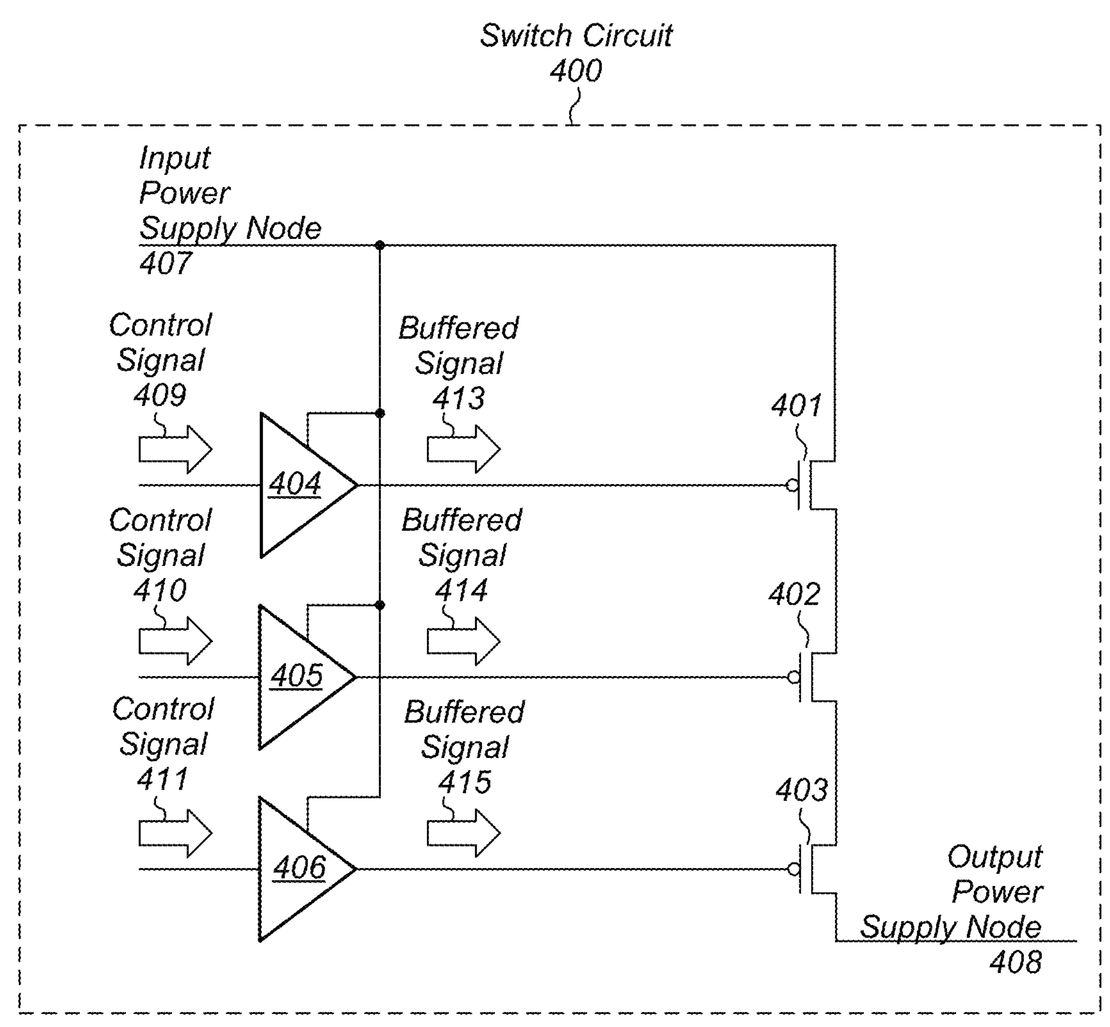
FIG. 4 is block diagram of a different embodiment of a switch circuit.

The switch circuit embodiments depicted in FIGS. 2 and 3 employ switch devices coupled, in parallel, between an input power supply node and a regulated power supply node. Switch circuits, however, are not limited to the use of parallel arrangements of switch devices. An embodiment of a switch circuit that relies on a series arrangement of switch devices is depicted in FIG. 4. As illustrated, switch circuit 400 includes switch devices 401-403 and buffer circuits 404-406.

Switch devices 401-403 are coupled, in series, between input power supply node 407 and output power supply node 408, and are controlled by corresponding ones of buffered signals 413-415. In various embodiments, input power supply node 407 may correspond to input power supply node 107 of FIG. 1, and output power supply node 408 may correspond to either of regulated power supply nodes 108A or 108B. It is noted that although three switch devices are depicted in the embodiment of FIG. 4, in other embodiments, any suitable number of switch devices may be employed. By using switch devices coupled, in series, between input power supply node 407 and output power supply node 408, a different conductance between the two supply nodes may be achieved. In some embodiments, switch circuits that use switch devices in series may be used in conjunction with switch circuits that employ switch devices in parallel to achieve a wider range of conductance values between input and output power supply nodes.

Each of switch devices 401-403 is configured, in response to activation of a corresponding one of buffered signals 413-415, to couple their respective source terminals to their respective drain terminals. For example, an activation of buffered signal 413 will cause switch device 401 to activate, allowing current to flow from input power supply node 407 through switch device 401 to the source terminal of switch device 402. When all of switch devices 401-403 are activated, current can flow from input power supply node 407 to output power supply node 408, thereby increasing the voltage level of output power supply node 408.

In various embodiments, switch devices 401-403 may be implemented as p-channel MOSFETs, FINFETs, GAAFETs, or any other suitable transconductance devices. It is noted that the electrical characteristics of switch devices 401-403 may be different from one another. In some cases, the respective widths of switch devices 401-403 may be different to allow each of switch devices 401-403 to have a different conductance between input power supply node 407 and output power supply node 408 when activated. For example, in some cases, the respective widths of switch devices 401-403 may be binary weighted such that the width of switch device 402 is twice the width of switch device 401, and so on.

Buffer circuits 404-406 are coupled to input power supply node 407 and are configured to generate buffered signals 413-415 using corresponding ones of control signals 409-411. In various embodiments, control signals 409-411 may be included in control signals 105 generated by control circuit 101 as depicted in FIG. 1. Although three buffer circuits are depicted in the embodiment of FIG. 4, in other embodiments where different numbers of switch devices are employed, a corresponding number of buffer circuits may be used. In various embodiments, buffer circuits 404-406 may be implemented using any suitable combination of inverter circuits, non-inverting amplifier circuits, and the like.

It is noted that a voltage level corresponding to an active state of buffered signals 413-415 may be based on a type of transconductance device used to implement switch devices 401-403. For example, in the case where switch devices 401-403 are implemented using p-channel MOSFETs, the voltage level corresponding to an active state of buffered signals 413-415 may be at or near ground potential.

In various embodiments, individual ones of switch circuits included in switch array 104 are coupled between an input power supply node and a regulated power supply node. The connections for a given switch circuit may be decided during a design phase of an integrated circuit that employs voltage regulator circuit 100, and then hardwired during the manufacture of the integrated circuit.

Figure 5:
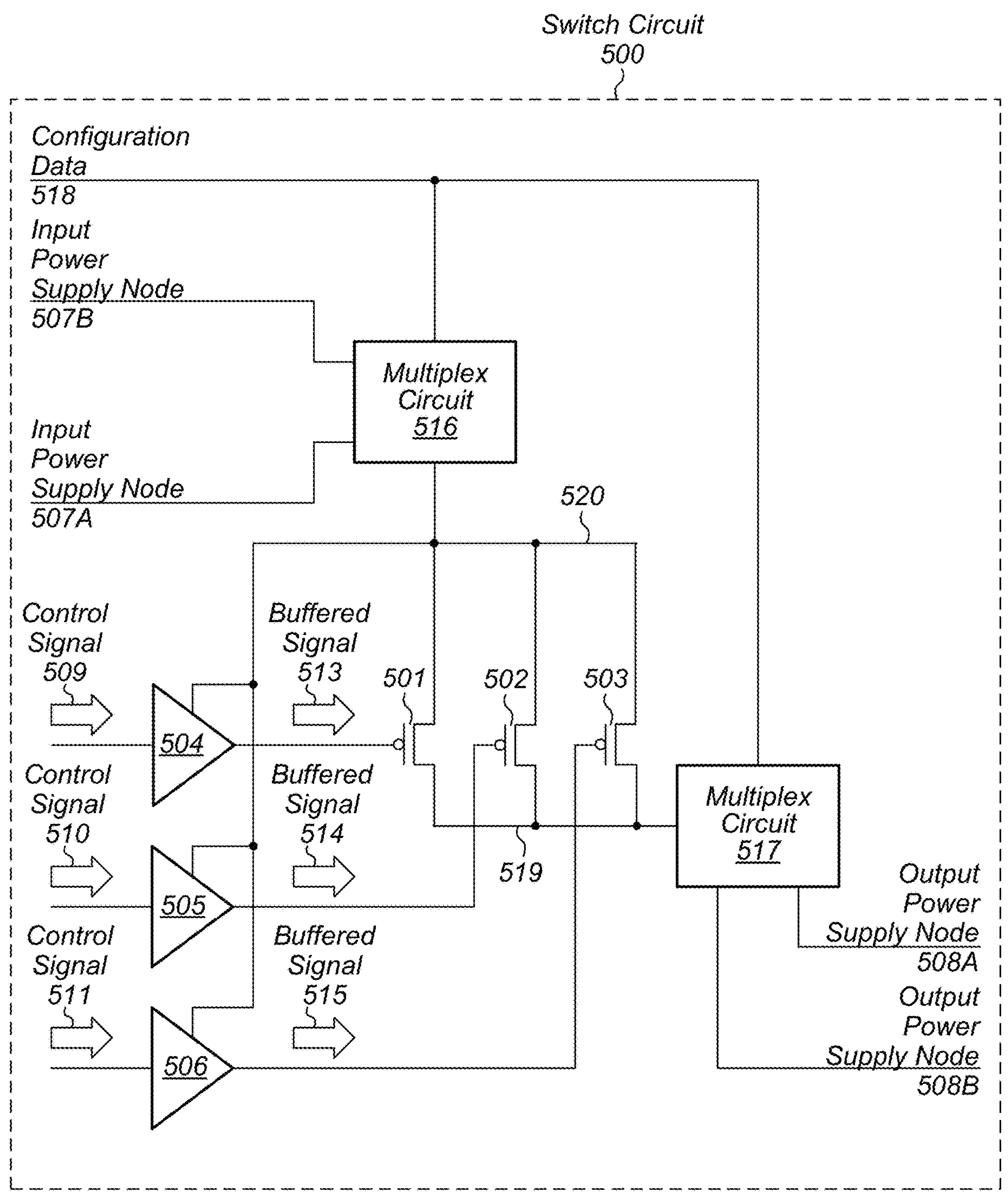
FIG. 5 is a block diagram of an embodiment of a switch circuit that includes multiplex circuits for dynamic switch array programming.

In some cases, however, it may be desirable to have an additional configuration available within switch array 104 to account for variation in load currents not comprehended during the design phase of the integrated circuit. To accommodate such changes in load current, a given switch circuit within switch array 104 can be configured to use different input power supply nodes and different output power supply nodes. A block diagram of an embodiment of such a switch circuit is depicted in FIG. 5. As illustrated, switch circuit 500 includes switch devices 501-503, buffer circuits 504-506, and multiplex circuits 516 and 517. It is noted that switch circuit 500 may, in various embodiments, correspond to either of switch circuits 102A-B.

Switch devices 501-503 are coupled, in parallel, between node 520 and node 519, and are controlled by corresponding ones of buffered signals 513-515. It is noted that although three switch devices are depicted in the embodiment of FIG. 5, in other embodiments, any suitable number of switch devices may be employed.

In various embodiments, switch devices 501-503 may be implemented as p-channel MOSFETs, FINFETs, GAAFETs, or any other suitable transconductance devices. It is noted that the electrical characteristics of switch devices 501-503 may be different from one another. In some cases, the respective widths of switch devices 501-503 may be different to allow each of switch devices 501-503 to have a different conductance between node 520 and node 519 when activated. For example, in some cases, the respective widths of switch devices 501-503 may be binary weighted such that the width of switch device 502 is twice the width of switch device 501, and so on.

Buffer circuits 504-506 are coupled to node 520 and are configured to generate buffered signals 513-515 using corresponding ones of control signals 509-511. In various embodiments, control signals 509-511 may be included in control signals 105 generated by control circuit 101 as depicted in FIG. 1. Although three buffer circuits are depicted in the embodiment of FIG. 5, in other embodiments where different numbers of switch devices are employed, a corresponding number of buffer circuits may be used. In various embodiments, buffer circuits 504-506 may be implemented using any suitable combination of inverter circuits, non-inverting amplifier circuits, and the like.

It is noted that a voltage level corresponding to an active state of buffered signals 513-515 may be based on a type of transconductance device used to implement switch devices 501-503. For example, in the case where switch devices 501-503 are implemented using p-channel MOSFETs, the voltage level corresponding to an active state of buffered signals 513-515 may be at or near ground potential.

Multiplex circuit 516 is configured to selectively couple either input power supply node 507B or input power supply node 507A to node 520 based on configuration data 518. Multiplex circuit 517 is configured to selectively couple node 519 to either of output power supply nodes 508A or 508B. In various embodiments, either of input power supply nodes 507A and 507B may correspond to input power supply node 107 of FIG. 1. By adjusting configuration data 518, switch devices 501-503 may be coupled between different combinations of input power supply nodes 507A-B and output power supply nodes 508A-B. In various embodiments, configuration data 518 may include multiple bits whose values may be adjusted based on load currents being drawn from output power supply nodes 508A-B or any other suitable criterion.

Multiplex circuits 516 and 517 may be implemented using multiple pass-gate structures coupled together in a wired-OR fashion, or any other suitable circuit configured to perform a multiplex function with analog voltage levels. It is noted that although only two input power supply nodes and two output power supply nodes are depicted in the embodiment of FIG. 5, in other embodiments, multiplex circuits 516 and 517 may be configured to use any suitable number of input power supply nodes and output power supply nodes.

Figure 6:
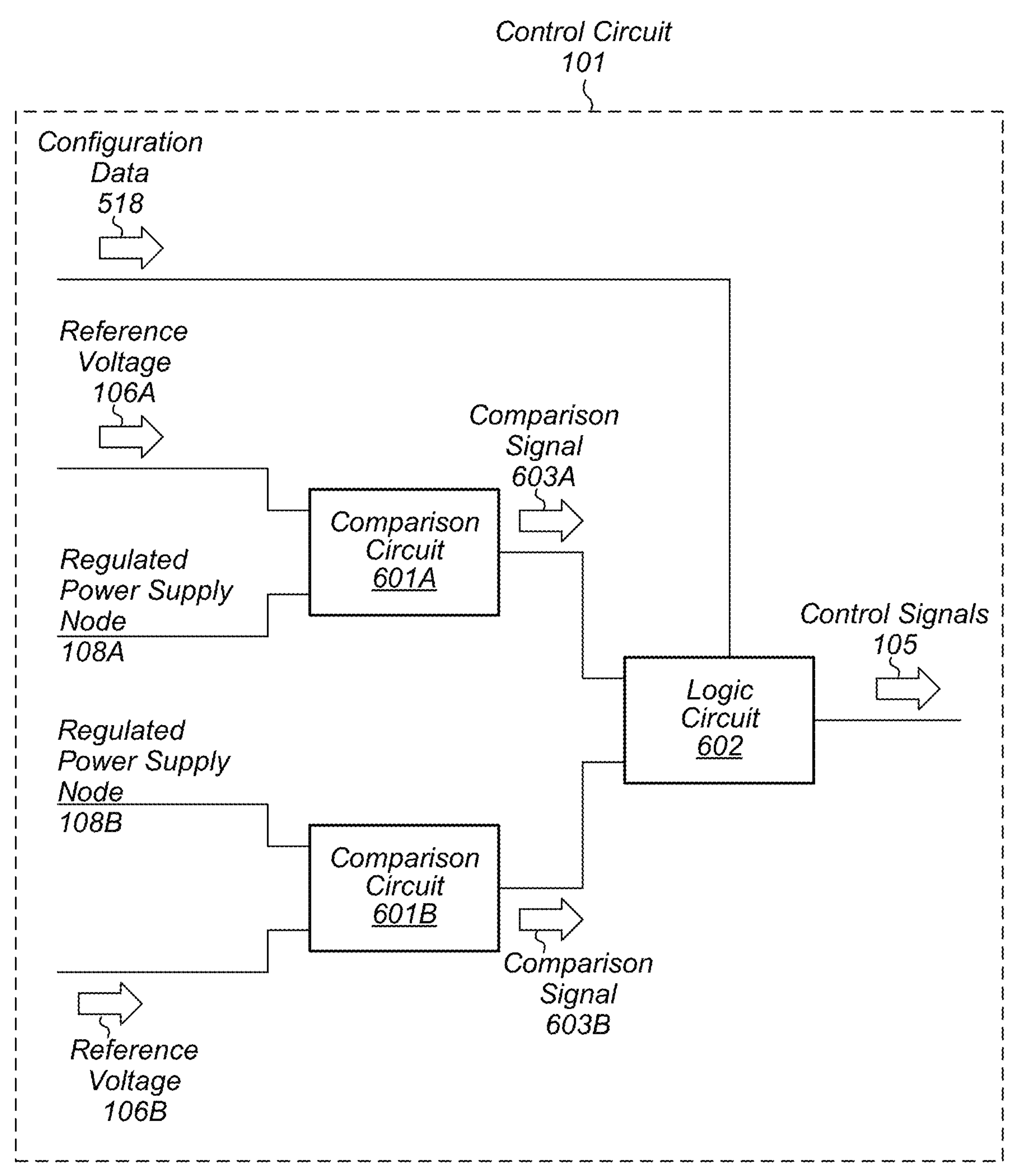
FIG. 6 is a block diagram of a control circuit for a voltage regulator circuit.

Turning to FIG. 6, a block diagram of an embodiment of control circuit 101 is depicted. As illustrated, control circuit 101 includes comparison circuits 601A-B and logic circuit 602.

Comparison circuit 601A is configured to generate comparison signal 603A using reference voltage 106A and a voltage level of regulated power supply node 108A, and comparison circuit 601B is configured to generate comparison signal 603B using reference voltage 106B and a voltage level of regulated power supply node 108B. To generate comparison signal 603A, comparison circuit 601A may be further configured to compare reference voltage 106A to the voltage level of regulated power supply node 108A, and quantize a result of the comparison to generate a plurality of bits that are included in comparison signal 603A. In a similar fashion, to generate comparison signal 603B, comparison circuit 601B may be further configured to compare reference voltage 106B to the voltage level of regulated power supply node 108B, and quantize a result of the comparison to generate a plurality of bits that are included in comparison signal 603B.

In various embodiments, comparison circuit 601A and comparison circuit 601B may be implemented using a comparator circuit such as a differential amplifier circuit configured to generate an output signal whose magnitude is proportional to a difference between two input signals. Additionally, comparison circuit 601A and comparison circuit 601B may be implemented using an analog-to-digital converter circuit configured to generate a plurality of bits whose value corresponds to a magnitude of an input signal.

Logic circuit 602 is configured to generate control signals 105 using comparison signals 603A-B and configuration data 518. In various embodiments, configuration data 518 may include multiple bits whose value indicates which of control signals 105 are to be used to control the voltage level of regulated power supply node 108A and which of control signals 105 are to be used to control the voltage level of regulated power supply node 108B. In some embodiments, configuration data 518 may be static and stored in a one-time programmable memory circuit or other non-volatile memory circuit. Alternatively, configuration data 518 may be adapted over time to account for varying load conditions on regulated power supply nodes 108A and 108B.

To generate control signals 105, logic circuit 602 may be further configured to activate different ones of control signals 105 in response to a determination that comparison signal 603A indicates that a voltage level of regulated power supply node 108A is less than reference voltage 106A. Alternatively, logic circuit 602 may be configured to de-activate other ones of control signals 105 in response to a determination that comparison signal 603A indicates that the voltage level of regulated power supply node 108A is greater than reference voltage 106A. In a similar fashion, logic circuit 602 may be configured to activate and de-active various ones of control signals 105 based on a value of comparison signal 603B. In various embodiments, logic circuit 602 may be implemented as a microcontroller, state machine, or a general-purpose processor circuit configured to execute software or program instructions.

It is noted that although only two comparison circuits are depicted in the embodiment of FIG. 6, in other embodiments, additional comparison circuits may be employed if switch array 104 is coupled to additional regulated power supply nodes. In such cases, logic circuit 602 may be further configured to use the additional comparison signals generated by the additional comparison circuits to generate control signals 105.

Figure 7:
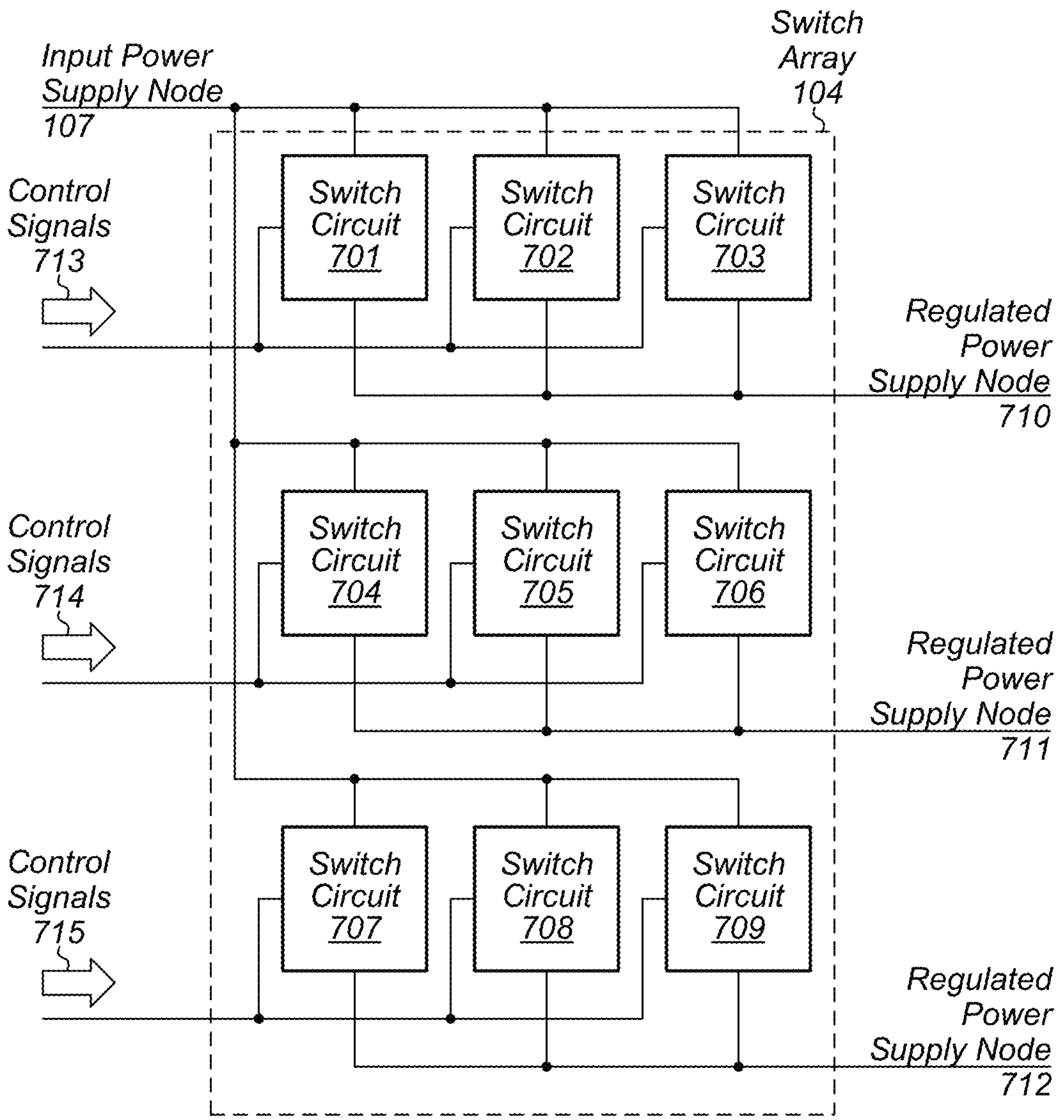
FIG. 7 is a block diagram of a particular arrangement of a switch array for a voltage regulator circuit.

By coupling different switch circuits within switch array 104 to different regulated power supply nodes and using separate control signals, switch array 104 may be used to generate multiple regulated voltages. A block diagram of an embodiment of switch array 104 that is configured to generate multiple regulated power supply voltages is depicted in FIG. 7. As illustrated, switch array 104 includes switch circuits 701-709. In various embodiments, switch circuits 701-709 may be implemented using any suitable combination of switch circuits 200, 300, 400, and 500. It is noted that although only nine switch circuits are depicted in the embodiment of FIG. 7, in other embodiments, any suitable number of switch circuits may be employed.

Switch circuits 701-703 are coupled between input power supply node 107 and regulated power supply node 710. In various embodiments, switch circuits 701-703 are configured to generate a particular voltage level on regulated power supply node 710 using control signals 713 and a voltage level of input power supply node 107.

Switch circuits 704-706 are coupled between input power supply node 107 and regulated power supply node 711. In various embodiments, switch circuits 704-706 are configured to generate a particular voltage level on regulated power supply node 711 using control signals 714 and the voltage level of input power supply node 107.

Switch circuits 707-709 are coupled between input power supply node 107 and regulated power supply node 712. In various embodiments, switch circuits 707-709 are configured to generate a particular voltage level on regulated power supply node 712 using control signals 715 and a voltage level of input power supply node 107. It is noted that control signals 713-715 may be included in control signals 105 as depicted in FIG. 1.

Figure 8:
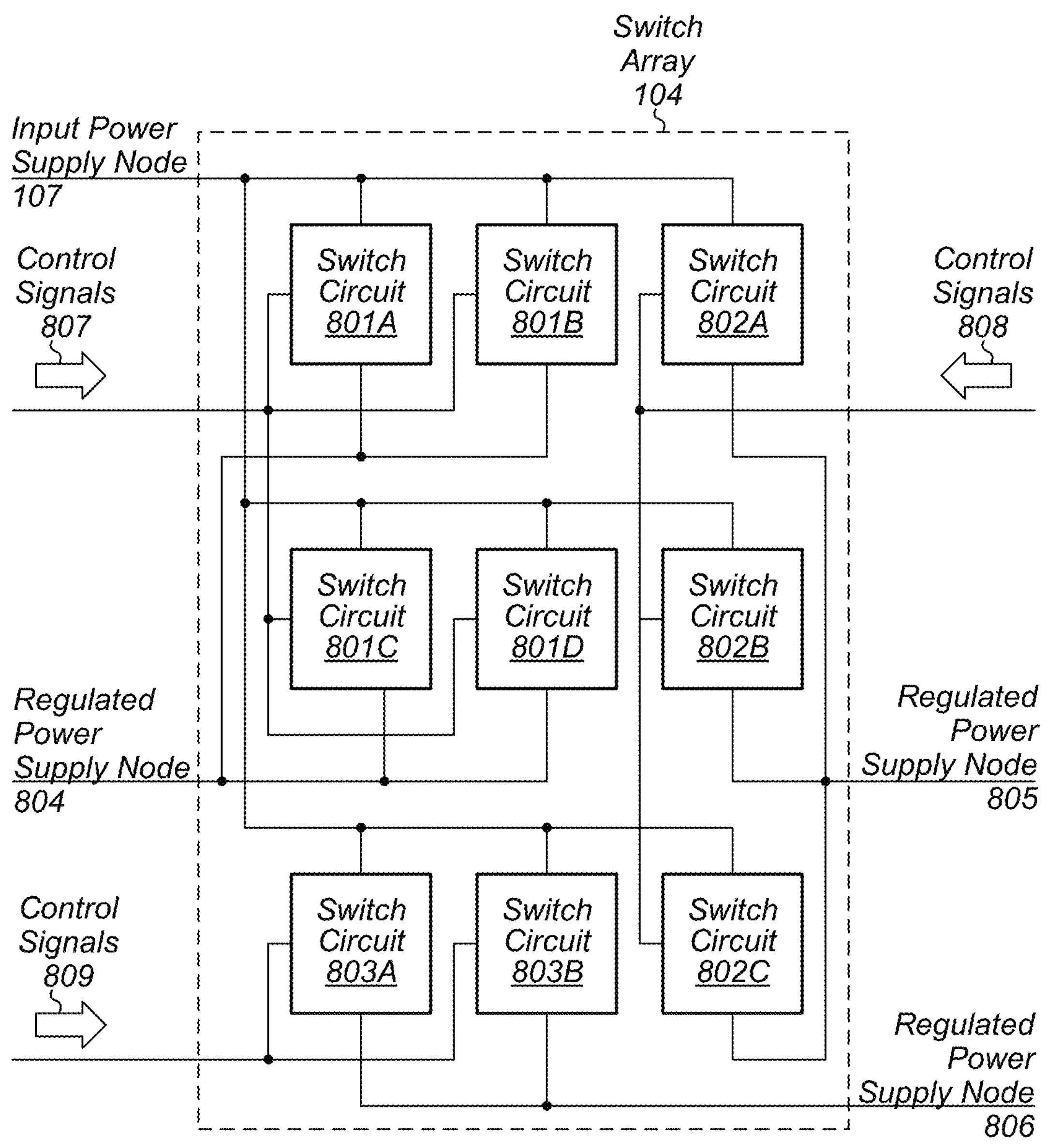
FIG. 8 is a block diagram of a different arrangement of a switch array for a voltage regulator circuit.

In the embodiment depicted in FIG. 7, rows of switch circuits are coupled together to provide regulation for a given regulated power supply node. In other embodiments, different load current requirements for regulated power supply nodes allow for different numbers of switch circuits to be employed to regulate a given power supply node. The different numbers of switch circuits may be arranged in various topologies other than rows to provide voltage regulation. A block diagram of another embodiment of switch array 104 with a different arrangement of switch circuits is depicted in FIG. 8. As illustrated, switch array 104 includes switch circuits 801A-D, 802A-C, and 803A-B. It is noted that although only nine switch circuits are depicted in the embodiment of FIG. 8, in other embodiments, any suitable number of switch circuits may be employed.

Switch circuits 801A-801D are coupled between input power supply node 107 and regulated power supply node 804. In various embodiments, switch circuits 801A-801D are configured to generate a particular voltage level on regulated power supply node 804 using a voltage level of input power supply node 107 and control signals 807. It is noted that control signals 807 may, in some embodiments, be included in control signals 105 as depicted in FIG. 1.

Switch circuits 802A-802C are coupled between input power supply node 107 and regulated power supply node 805. In various embodiments, switch circuits 802A-802C are configured to generate a particular voltage level on regulated power supply node 805 using a voltage level of input power supply node 107 and control signals 808. It is noted that control signals 808 may, in some embodiments, be included in control signals 105 as depicted in FIG. 1.

Switch circuits 803A-803B are coupled between input power supply node 107 and regulated power supply node 806. In various embodiments, switch circuits 803A-803B are configured to generate a particular voltage level on regulated power supply node 806 using a voltage level of input power supply node 107 and control signals 809. It is noted that control signals 809 may, in some embodiments, be included in control signals 105 as depicted in FIG. 1.

Figure 9:
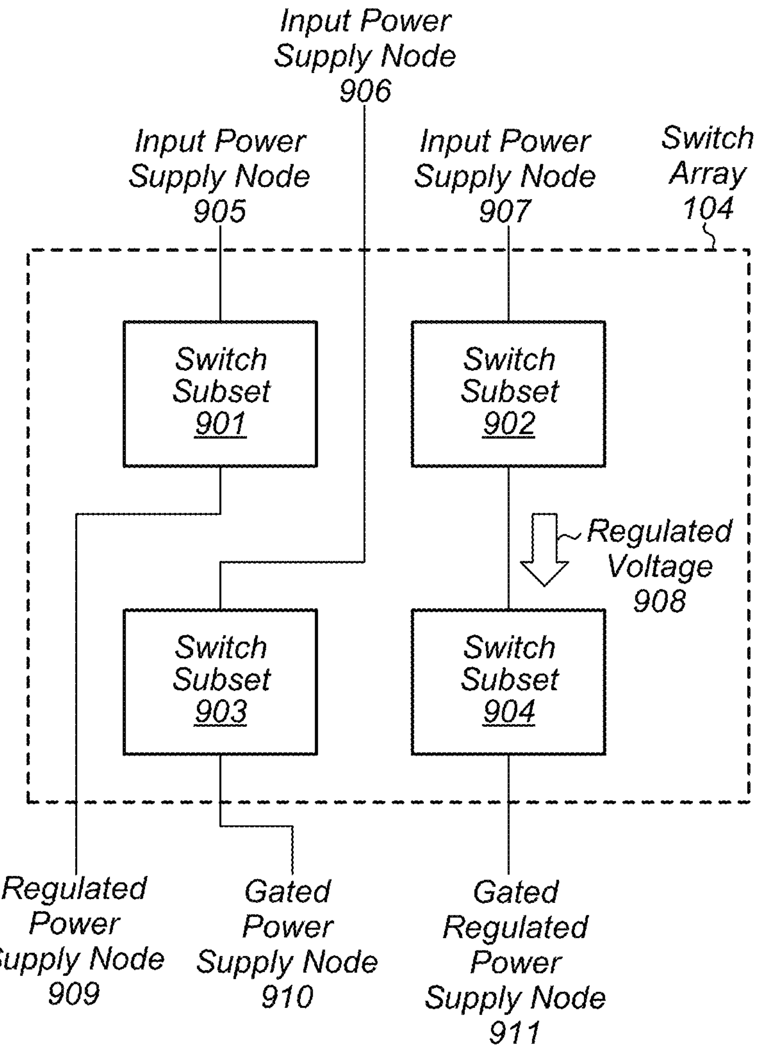
FIG. 9 is a block diagram of another arrangement of a switch array for a voltage regulator circuit.

In some cases, the voltage regulation function and the switching function of the switch circuits within a switch array may be used in combination. A block diagram of an embodiment of switch array 104 that employs both the voltage regulation function and switching function is depicted in FIG. 9. As illustrated, switch array 104 includes switch subsets 901-904. In various embodiments, each of switch subsets 901-904 includes one or more of any suitable combination of switch circuits 200, 300, 400, or 500 arranged in series, parallel, or any suitable combination thereof. It is noted that control signals, such as control signals 105, have been omitted for clarity.

As illustrated, switch subset 901 is configured to generate a particular voltage level on regulated power supply node 909 using a voltage level of input power supply node 905. Switch subset 903 is configured to operate in a switching mode to generate gated power supply node 910 using input power supply node 906. For example, switch circuits included in switch subset 903 are configured to selectively couple (or de-couple) input power supply node 906 to (or from) gated power supply node 910. By de-coupling the two power supply nodes, gated power supply node 910 can be allowed to float to save power during power gating operations.

In some embodiments, switch subset 902 is configured to generate regulated voltage 908 using a voltage level of input power supply node 907. In various embodiments, different ones of the switch circuits included in switch subset 902 may be activated to adjust the voltage level of regulated voltage 908.

Switch subset 904 is also configured to operate in a switching mode to generate a voltage level on gated regulated power supply node 911. In various embodiments, switch subset 904 is configured to couple an output of switch subset 902 to gated regulated power supply node 911, allowing the voltage level of gated regulated power supply node 911 to become regulated voltage 908. In response to a power gating operation or other suitable condition, switch subset 904 is configured to de-couple gated power supply node 911 from the output of switch subset 902, allowing gated regulated power supply node 911 to float. By using different subsets of switch circuits together, power gating can be achieved for regulated power supply nodes as well.

Although the embodiment of switch array 104 illustrated in FIG. 9 depicts only four subsets of switch circuits, in other embodiments, any suitable number of subsets of switch circuits may be employed.

Turning to FIG. 10, a flow diagram depicting an embodiment of a method for operating a voltage regulator circuit is illustrated. The method, which may be applied to various voltage regulator circuits such as voltage regulator circuit 100, begins in block 1001.

The method includes performing a first comparison of a voltage of a first regulated power supply node to a first reference voltage (block 1002). In various embodiments, performing the first comparison may include generating a first difference voltage using the voltage level of the first regulated power supply node and the first reference voltage, and quantizing the first difference voltage to generate a first plurality of bits. In such cases, the method may further include generating a first plurality of control signals using the plurality of bits.

The method also includes activating, based on a first result of the first comparison, a particular switch circuit of a first subset of a plurality of switch circuits, where the first subset is coupled between an input power supply node and the first regulated power supply node, and where a number of switch circuits included in the first subset is based on a first target load current for the first regulated power supply node (block 1003).

In various embodiments, the particular switch circuit may include a plurality of switch devices coupled, in series, between the input power supply node and the first regulated power supply node. In such cases, activating, based on the first result, the particular switch circuit includes activating the plurality of switch devices using corresponding ones of the first plurality of control signals.

In other embodiments, the particular switch circuit may include a plurality of switch devices coupled, in parallel, between the input power supply node and the first regulated power supply node. In such cases, activating, based on the first result, the particular switch circuit includes activating at least one of the plurality of switch devices using the first plurality of control signals.

In some embodiments, the particular switch circuit may include a plurality of switch devices coupled between the input power supply node and the first regulated power supply node. In such cases, activating, based on the first result, the particular switch circuit may include buffering, using a boost power supply node, a subset of the first plurality of control signals to generate a plurality of buffered signals, and activating at least one of the plurality of switch devices using the plurality of buffered signals. It is noted that a voltage level of the boost power supply node is greater than the voltage level of the input power supply node.

The method further includes performing a second comparison of a voltage of a second regulated power supply node to a second reference voltage (block 1004). In various embodiments, performing the second comparison may include generating a second difference voltage using the voltage level of the second regulated power supply node and the second reference voltage, and quantizing the second difference voltage to generate a second plurality of bits. In such cases, the method may further include generating a second plurality of control signals using the second plurality of bits.

The method also includes adjusting, based on a second result of the second comparison, a conductance between the input power supply node and the second regulated power supply node by activating a different switch circuit of a second subset of a plurality of switch circuits, where the second subset is coupled between the input power supply node and the second regulated power supply node, and where a number of switch circuits included in the second subset of the plurality of switch circuits is based on a second target load current for the second regulated power supply node (block 1005).

In some embodiments, adjusting, based on the second result, the conductance between the input power supply node and the second regulated power supply node may include, in response to determining that the voltage level of the second regulated power supply node is less than the second reference voltage by a threshold value, activating another switch circuit of the second subset of the plurality of switch circuits.

In various embodiments, the different switch circuit includes a plurality of switch devices coupled between the input power supply node and the second regulated power supply node. In such cases, adjusting, based on the second result, the conductance between the input power supply node and the second regulated power supply node may include activating a subset of the plurality of switch devices, where a number of switch devices included in the subset of the plurality of switch devices is based on a difference between the voltage level of the second regulated power supply node and the second reference voltage. The method concludes in block 1006.

Figure 11:
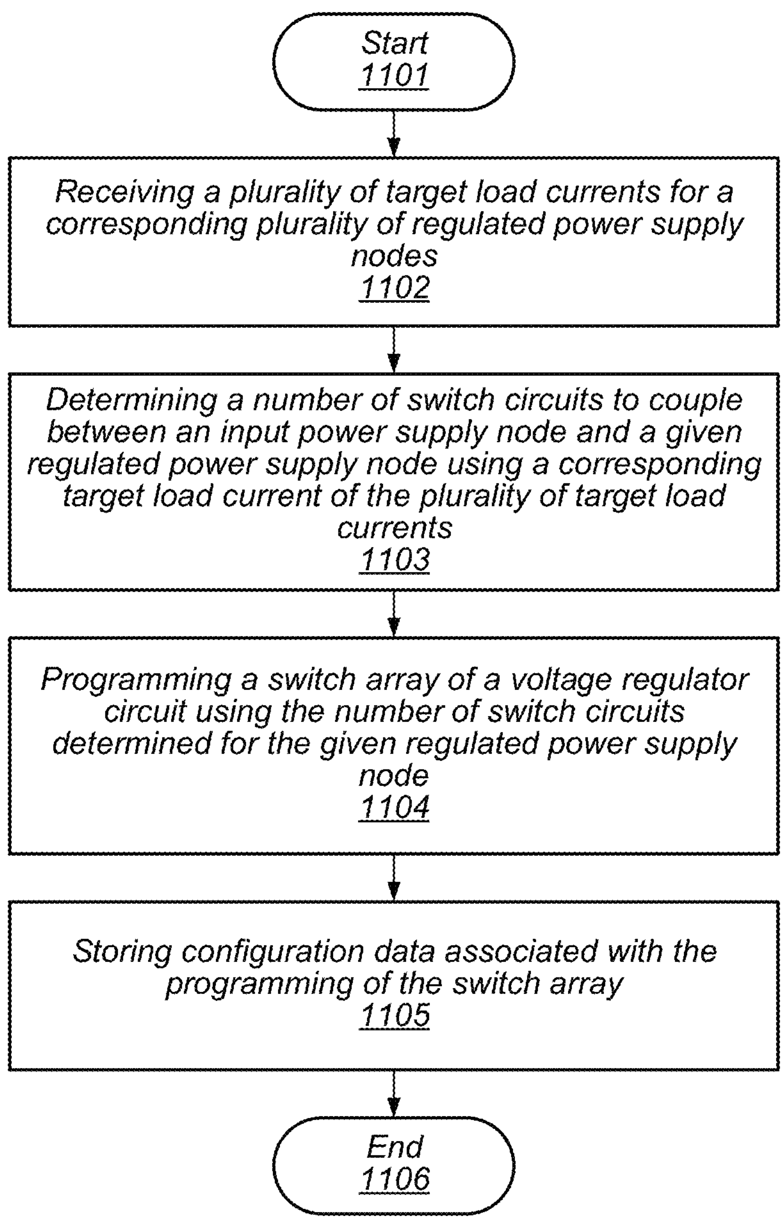
FIG. 11 is a flow diagram of an embodiment of a method for programming a voltage regulator switch array.

Turning to FIG. 11, a flow diagram depicting an embodiment of a method for programming a voltage regulator switch array is illustrated. The method, which may be applied to various switch arrays, such as switch array 104, begins in block 1101.

The method includes receiving a plurality of target load currents for a corresponding plurality of regulated power supply nodes (block 1102). In various embodiments, the method may also include generating the plurality of target load currents by simulating load circuit performance under a variety of manufacturing and operating conditions.

The method also includes determining a number of switch circuits to couple between an input power supply node and a given regulated power supply node of the corresponding plurality of regulated power supply nodes using a corresponding target load current of the plurality of target load currents (block 1103). In various embodiments, determining the number of switch circuits includes determining a range of conductance values that support the corresponding target load current. In some embodiments, the method may further include determining a configuration of switch devices (parallel, series, or a combination thereof), and a type of switch device based on the range of conductance values.

The method further includes programming a switch array of a voltage regulator circuit using the number of switch circuits determined for the given regulated power supply node (block 1104). In some embodiments, programming the switch array includes adjusting one or more mask layers used in the fabrication of an integrated circuit to couple different switch circuits to different input power supply nodes and different regulated power supply nodes.

The method also includes storing configuration data associated with the programming of the switch array (block 1105). The configuration data may, in various embodiments, include information indicative of power supply nodes to which a given switch circuit is coupled. In some embodiments, storing the configuration data includes programming a one-time programmable memory circuit or other suitable non-volatile memory circuit using the configuration data. The method ends in block 1106.

Figure 12:
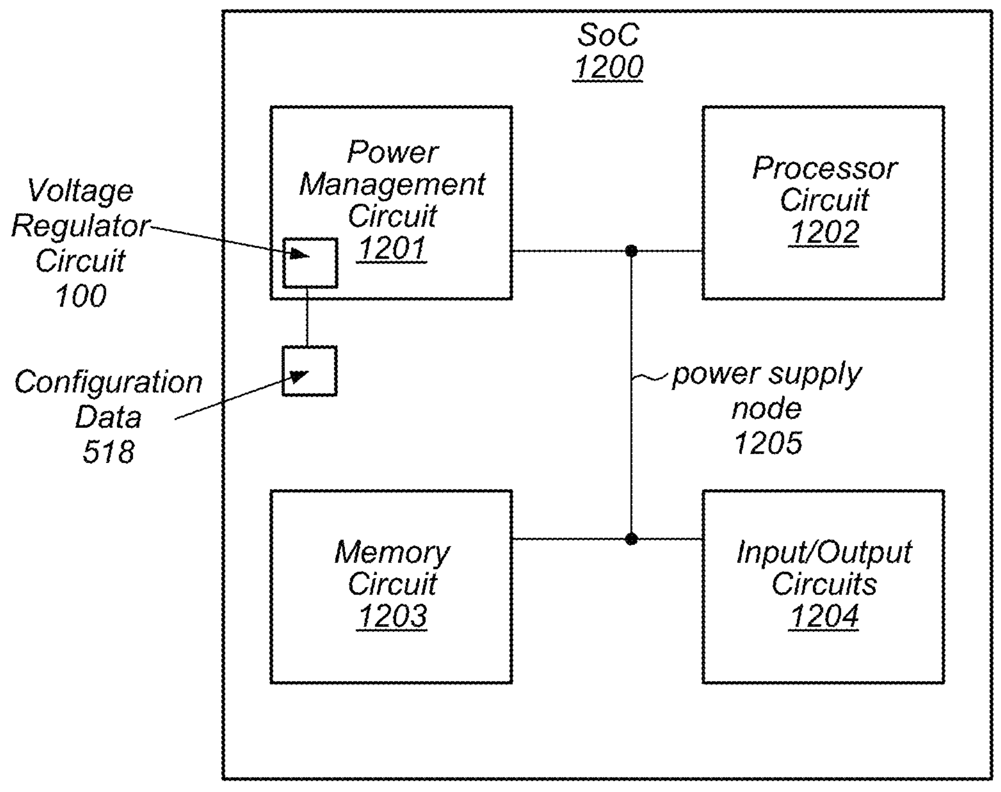
FIG. 12 is a block diagram of one embodiment of a system-on-a-chip that includes a voltage regulator circuit.

A block diagram of a system-on-a-chip (SoC) is illustrated in FIG. 12. In the illustrated embodiment, SoC 1200 includes power management circuit 1201, processor circuit 1202, input/output circuits 1204, and memory circuit 1203, each of which is coupled to power supply node 1205. SoC 1200 also includes configuration data 518. In various embodiments, SoC 1200 may be configured for use in a desktop computer, server, or in a mobile computing application such as, e.g., a tablet, laptop computer, or wearable computing device.

Power management circuit 1201 includes voltage regulator circuit 100 which is configured to generate a regulated voltage level on power supply node 1205 in order to provide power to processor circuit 1202, input/output circuits 1204, and memory circuit 1203. In various embodiments, the arrangement of switches within voltage regulator circuit 100 may be controlled by configuration data 518. In some embodiments, configuration data 518 may be stored in a one-time programmable memory or other suitable non-volatile circuit. In some cases, configuration data 518 may be updated based on changes in load current for a power supply node, such as power supply node 1205.

Although power management circuit 1201 is depicted as including a single voltage regulator circuit, in other embodiments, any suitable number of voltage regulator circuits may be included in power management circuit 1201, each configured to generate a regulated voltage level on a respective one of multiple internal power supply signals included in SoC 1200.

Processor circuit 1202 may, in various embodiments, be representative of a general-purpose processor that performs computational operations. For example, processor circuit 1202 may be a central processing unit (CPU) such as a microprocessor, a microcontroller, an application-specific integrated circuit (ASIC), or a field-programmable gate array (FPGA).

Memory circuit 1203 may, in various embodiments, include any suitable type of memory such as Dynamic Random-Access Memory (DRAM), Static Random-Access Memory (SRAM), Read-Only Memory (ROM), Electrically Erasable Programmable Read-only Memory (EEPROM), or non-volatile memory, for example. It is noted that although a single memory circuit is illustrated in FIG. 12, in other embodiments, any suitable number of memory circuits may be employed.

Input/output circuits 1204 may be configured to coordinate data transfer between SoC 1200 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1204 may be configured to implement a version of Universal Serial Bus (USB) protocol or IEEE 1394 (Firewire®) protocol.

Input/output circuits 1204 may also be configured to coordinate data transfer between SoC 1200 and one or more devices (e.g., other computing systems or integrated circuits) coupled to SoC 1200 via a network. In one embodiment, input/output circuits 1204 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1204 may be configured to implement multiple discrete network interface ports.

Figure 13:
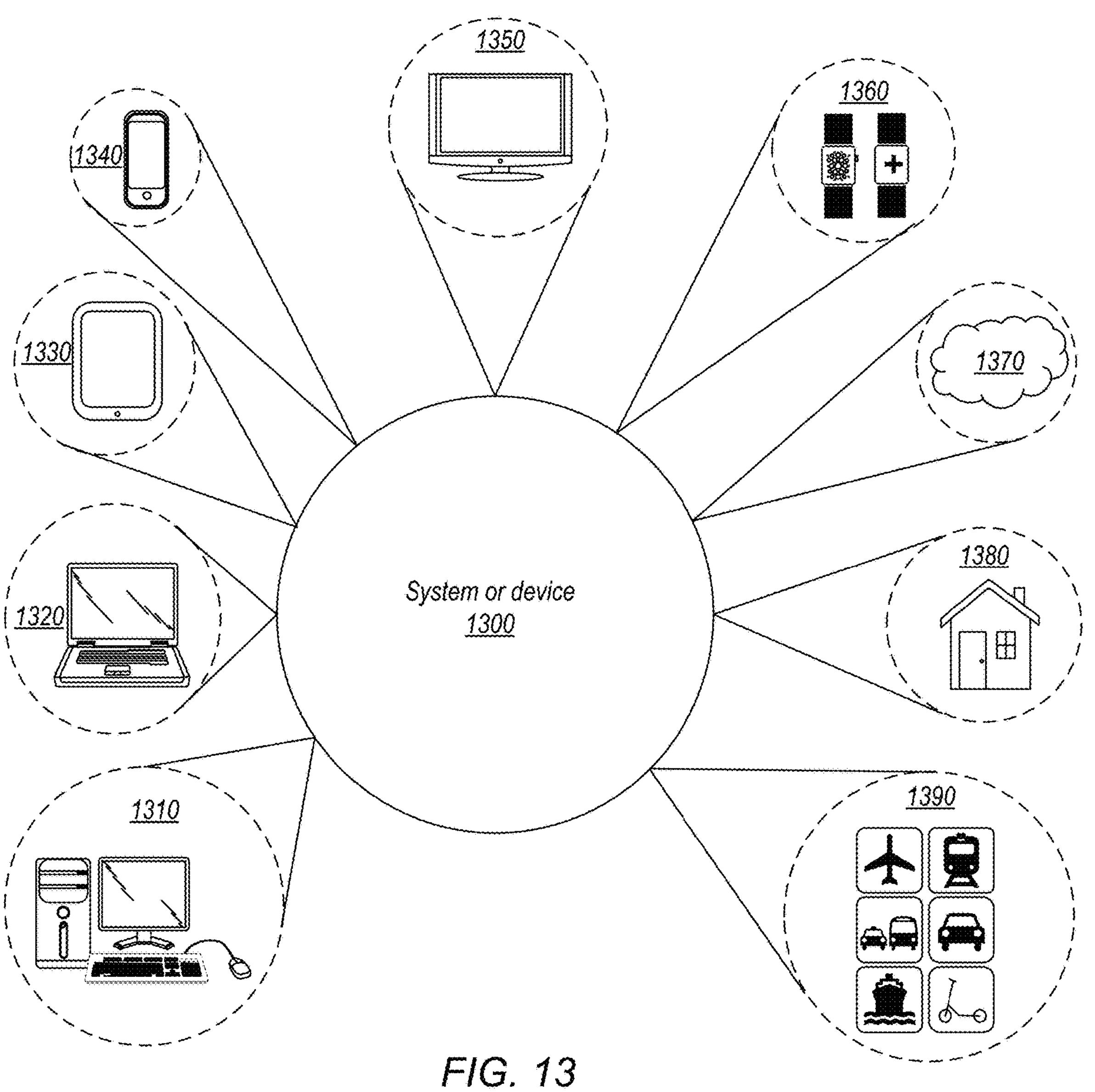
FIG. 13 is a block diagram of various embodiments of computer systems that may include power converter circuits.

Turning now to FIG. 13, various types of systems that may include any of the circuits, devices, or systems discussed above are illustrated. System or device 1300, which may incorporate or otherwise utilize one or more of the techniques described herein, may be utilized in a wide range of areas. For example, system or device 1300 may be utilized as part of the hardware of systems such as a desktop computer 1310, laptop computer 1320, tablet computer 1330, cellular or mobile phone 1340, or television 1350 (or set-top box coupled to a television).

Similarly, disclosed elements may be utilized in a wearable device 1360, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1300 may also be used in various other contexts. For example, system or device 1300 may be utilized in the context of a server computer system, such as a dedicated server or on shared hardware that implements a cloud-based service 1370. Still further, system or device 1300 may be implemented in a wide range of specialized everyday devices, including devices 1380 commonly found in the home such as refrigerators, thermostats, security cameras, etc. The interconnection of such devices is often referred to as the "Internet of Things" (IoT). Elements may also be implemented in various modes of transportation. For example, system or device 1300 could be employed in the control systems, guidance systems, entertainment systems, etc. of various types of vehicles 1390.

The applications illustrated in FIG. 13 are merely exemplary and are not intended to limit the potential future applications of disclosed systems or devices. Other example applications include, without limitation: portable gaming devices, music players, data storage devices, unmanned aerial vehicles, etc.

Figure 14:
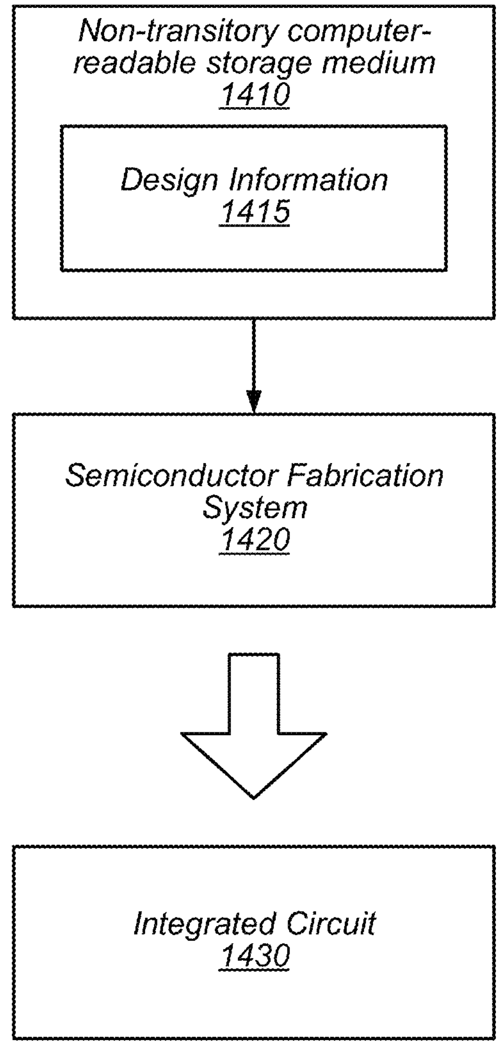
FIG. 14 illustrates an example of a non-transitory computer-readable storage medium that stores circuit design information.

FIG. 14 is a block diagram illustrating an example of a non-transitory computer-readable storage medium that stores circuit design information, according to some embodiments. In the illustrated embodiment, semiconductor fabrication system 1420 is configured to process the design information 1415 stored on non-transitory computer-readable storage medium 1410 and fabricate integrated circuit 1430 based on design information 1415.

Non-transitory computer-readable storage medium 1410 may comprise any of various appropriate types of memory devices or storage devices. Non-transitory computer-readable storage medium 1410 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as Flash memory, magnetic media, e.g., a hard drive, or optical storage; registers, or other similar types of memory elements, etc. Non-transitory computer-readable storage medium 1410 may include other types of non-transitory memory as well or combinations thereof. Non-transitory computer-readable storage medium 1410 may include two or more memory mediums, which may reside in different locations, e.g., in different computer systems that are connected over a network.

Design information 1415 may be specified using any of various appropriate computer languages, including hardware description languages such as, without limitation: VHDL, Verilog, SystemC, SystemVerilog, RHDL, M, MyHDL, etc. Design information 1415 may be usable by semiconductor fabrication system 1420 to fabricate at least a portion of integrated circuit 1430. The format of design information 1415 may be recognized by at least one semiconductor fabrication system, such as semiconductor fabrication system 1420, for example. In some embodiments, design information 1415 may include a netlist that specifies elements of a cell library, as well as their connectivity. One or more cell libraries used during logic synthesis of circuits included in integrated circuit 1430 may also be included in design information 1415. Such cell libraries may include information indicative of device or transistor level netlists, mask design data, characterization data, and the like, of cells included in the cell library.

Integrated circuit 1430 may, in various embodiments, include one or more custom macrocells, such as memories, analog or mixed-signal circuits, and the like. In such cases, design information 1415 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1420 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1420 may also be configured to perform various testing of fabricated circuits for correct operation.

In various embodiments, integrated circuit 1430 is configured to operate according to a circuit design specified by design information 1415, which may include performing any of the functionality described herein. For example, integrated circuit 1430 may include any of various elements shown or described herein. Further, integrated circuit 1430 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:

a switch array including a first set of a plurality of switch circuits coupled between an input power supply node and a first regulated power supply node, wherein the first set of the plurality of switch circuits includes a first plurality of switch devices configured to couple the input power supply node to the first regulated power supply node; and a control circuit configured to:

compare a first reference voltage to a first output voltage of the first regulated power supply node;

in response to the first output voltage failing to satisfy the first reference voltage, activate, based on a first control signal of a first set of control signals generated by the control circuit, a first switch device of the first plurality of switch devices; and in response to the first output voltage failing to satisfy the first reference voltage after activation of the first switch device and while the first switch device remains activated, activate first one or more additional switch devices of the first plurality of switch devices based on a first one or more additional control signals of the first set of control signals until the first output voltage satisfies the first reference voltage.

2. The apparatus of claim 1, wherein:

the switch array further includes a second set of the plurality of switch circuits coupled between the input power supply node and a second regulated power supply node;

the second set of the plurality of switch circuits includes a second plurality of switch devices configured to couple the input power supply node to the second regulated power supply node; and the control circuit is further configured to:

compare a second reference voltage to a second output voltage of the second regulated power supply node;

in response to the second output voltage failing to satisfy the second reference voltage, activate, based on a second control signal of a second set of control signals generated by the control circuit, a second switch device of the second plurality of switch devices; and in response to the second output voltage failing to satisfy the second reference voltage after activation of the second switch device and while the second switch device remains activated, activate a second one or more additional switch devices of the second plurality of switch devices based on a second one or more additional control signals of the second set of control signals until the second output voltage satisfies the second reference voltage.

3. The apparatus of claim 2, wherein:

a given switch circuit of the first set of the plurality of switch circuits, the second set of the plurality of switch circuits, or both includes a plurality of buffer circuits configured to generate a corresponding plurality of buffered signals based on a subset of the first set of control signals or the second set of control signals; and in response to receipt of a buffered signal of the plurality of buffered signals, the first switch device is configured to couple the input power supply node to the first regulated power supply node or the second switch device is configured to couple the input power supply node to the second regulated power supply node.

4. The apparatus of claim 3, wherein the plurality of buffer circuits is coupled to a boost supply node, a voltage of which is greater than a voltage level of the input power supply node, and wherein an active level of a given one of the corresponding plurality of buffered signals is greater than the voltage level of the input power supply node.

5. The apparatus of claim 3, wherein, to activate the first switch device of the first plurality of switch devices, the control circuit is configured to provide the buffered signal to the first switch device, or wherein to active the second switch device of the second plurality of switch devices, the control circuit is configured to provide the buffered signal to the second switch device.

6. The apparatus of claim 2, wherein a given switch circuit of the first set, the second set, or both includes:

a first node coupled to a subset of the first plurality of switch devices or of the second plurality of switch devices;

a second node coupled to the subset of the first plurality of switch devices or the second plurality of switch devices;

a first multiplex circuit configured to couple the first node to a first input supply node or to a second input supply node, wherein the input power supply node corresponds to the first input supply node or to the second input supply node; and a second multiplex circuit configured to couple the second node to a first output power supply node or to a second output power supply node.

7. The apparatus of claim 6, wherein to couple the first node to the first input supply node or to the second input supply node, the first multiplex circuit is configured to select the first input supply node or the second input supply node based on configuration data, wherein the configuration data includes multiple bits, values of which are adjusted based on a load current drawn from the first output power supply node or from the second output power supply node.

8. The apparatus of claim 7, wherein, to couple the second node to a first output power supply node or to a second output power supply node, the second multiplex circuit is configured to select the first output power supply node or the second output power supply node based on the configuration data.

9. The apparatus of claim 1, wherein the first plurality of switch devices includes high-speed thin-oxide field-effect transistors.

10. The apparatus of claim 1, wherein the control circuit is further configured to:

activate a subset of the first plurality of switch devices based on a target conductance between the input power supply node and the first regulated power supply node, and quantize a result of a comparison of the first reference voltage to a first voltage level of the first regulated power supply node.

11. A method, comprising:

comparing, by a control circuit, a first reference voltage to a first output voltage of a first regulated power supply node, the first regulated power supply node configured to be coupled to an input power supply node by a first plurality of switch devices of a first set of a plurality of switch circuits, the plurality of switch circuits included in a switch array and coupled between the input power supply node and the first regulated power supply node;

activating, based on a first control signal of a first set of control signals generated by the control circuit, a first switch device of the first plurality of switch devices in response to the first output voltage failing to satisfy the first reference voltage; and activating a first one or more additional switch devices of the first plurality of switch devices based on a first one or more additional control signals of the first set of control signals until the first output voltage satisfies the first reference voltage, the activating the first one or more additional switch devices performed in response to the first output voltage failing to satisfy the first reference voltage after activation of the first switch device and while the first switch device remains activated.

12. The method of claim 11, further comprising:

comparing, by the control circuit, a second reference voltage to a second output voltage of a second regulated power supply node, wherein the switch array further includes a second set of the plurality of switch circuits coupled between the input power supply node and a second regulated power supply node, and wherein the second set of the plurality of switch circuits includes a second plurality of switch devices configured to couple the input power supply node to the second regulated power supply node;

activating, based on a second control signal of a second set of control signals generated by the control circuit, a second switch device of the second plurality of switch devices, the activating performed in response to the second output voltage failing to satisfy the second reference voltage; and activating a second one or more additional switch devices of the second plurality of switch devices based on a second one or more additional control signals of the second set of control signals until the second output voltage satisfies the second reference voltage, the activating the second one or more additional switch devices performed in response to the second output voltage failing to satisfy the second reference voltage after activation of the second switch device and while the second switch device remains activated.

13. The method of claim 12, further comprising:

generating, by a plurality of buffer circuits, a corresponding plurality of buffered signals based on a subset of the first set of control signals or the second set of control signals, wherein a given switch circuit of the first set, the second set, or both includes the plurality of buffer circuits; and coupling the input power supply node to the first regulated power supply node or the second regulated power supply node, wherein the coupling is performed in response to receipt of a buffered signal of the plurality of buffered signals.

14. The method of claim 13, wherein activating the first switch device of the first plurality of switch devices includes providing the buffered signal to the first switch device, or wherein activating the second switch device of the second plurality of switch devices includes providing the buffered signal to the second switch device.

15. The method of claim 11, further comprising:

activating a subset of the first plurality of switch devices based on a target conductance between the input power supply node and the first regulated power supply node, and quantizing a result of a comparison of the first reference voltage to a first voltage level of the first regulated power supply node.

16. An apparatus comprising:

a power management circuit that includes a voltage regulator circuit, wherein the voltage regulator circuit includes:

a switch array including a first set of a plurality of switch circuits coupled between an input power supply node and a first regulated power supply node, wherein the first set of the plurality of switch circuits includes a first plurality of switch devices configured to couple the input power supply node to the first regulated power supply node; and a control circuit configured to:

compare a first reference voltage to a first output voltage of the first regulated power supply node;

in response to the first output voltage failing to satisfy the first reference voltage, activate, based on a first control signal of a first set of control signals generated by the control circuit, a first switch device of the first plurality of switch devices; and in response to the first output voltage failing to satisfy the first reference voltage after activation of the first switch device and while the first switch device remains activated, activate a first one or more additional switch devices of the first plurality of switch devices based on a first one or more additional control signals of the first set of control signals until the first output voltage satisfies the first reference voltage.

17. The apparatus of claim 16, wherein:

the switch array further includes a second set of the plurality of switch circuits coupled between the input power supply node and a second regulated power supply node;

the second set of the plurality of switch circuits includes a second plurality of switch devices configured to couple the input power supply node to the second regulated power supply node; and the control circuit is further configured to:

compare a second reference voltage to a second output voltage of the second regulated power supply node;

in response to the second output voltage failing to satisfy the second reference voltage, activate, based on a second control signal of a second set of control signals generated by the control circuit, a second switch device of the second plurality of switch devices; and in response to the second output voltage failing to satisfy the second reference voltage after activation of the second switch device and while the second switch device remains activated, activate a second one or more additional switch devices of the second plurality of switch devices based on a second one or more additional control signals of the second set of control signals until the second output voltage satisfies the second reference voltage.

18. The apparatus of claim 17, wherein the first plurality of switch devices and the second plurality of switch devices include high-speed thin-oxide field-effect transistors.

19. The apparatus of claim 16, wherein the control circuit is further configured to:

activate a subset of the first plurality of switch devices based on a target conductance between the input power supply node and the first regulated power supply node, and quantize a result of a comparison of the first reference voltage to a first voltage level of the first regulated power supply node.

20. The apparatus of claim 16, further comprising a power supply node configured to couple the power management circuit to a plurality of functional circuits, wherein the power management circuit is configured to provide the first output voltage to the power supply node via the first regulated power supply node.

* * * * *